US012794324B2

(12) United States Patent
Xue et al.

(10) Patent No.: US 12,794,324 B2
(45) Date of Patent: Nov. 10, 2026

(54) INVERTER

(71) Applicant: Jing-Jin Electric Technologies Co., Ltd., Beijing (CN)

(72) Inventors: Fengzhu Xue, Beijing (CN); Gabriel Gallegos Lopez, Beijing (CN); Hao Zhang, Beijing (CN); Zhiyong Gao, Beijing (CN); Jia Shi, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 199 days.

(21) Appl. No.: 18/815,999

(22) Filed: Aug. 27, 2024

(65) Prior Publication Data

US 2026/0018974 A1 Jan. 15, 2026

(30) Foreign Application Priority Data

Jul. 12, 2024 (CN) ........................ 202410937215.X

(51) Int. Cl.
*F16D 65/16* (2006.01)
*B60K 23/04* (2006.01)
(Continued)

(52) U.S. Cl.
CPC .............. *H02K 11/33* (2016.01); *B60K 23/04* (2013.01); *B60L 15/007* (2013.01); *B60L 15/20* (2013.01);
(Continued)

(58) Field of Classification Search
CPC .. H02K 11/33; B60K 23/04; B60K 2023/046; F16H 48/34
See application file for complete search history.

(56) References Cited

U.S. PATENT DOCUMENTS

2008/0121443 A1* 5/2008 Clark .................... B60T 13/586 320/134
2021/0380078 A1 12/2021 Plow et al.
(Continued)

FOREIGN PATENT DOCUMENTS

CN 117052861 A 2/2023
CN 119857361 A 10/2023
(Continued)

OTHER PUBLICATIONS

Notice of Reasons for Refusal, Japan Application No. 2024-046896, Aug. 18, 2025, 5 pgs.
European Search Report, Feb. 28, 2025.

*Primary Examiner* — Cortez M Cook
(74) *Attorney, Agent, or Firm* — Vedder Price P.C.

(57) ABSTRACT

An inverter is disclosed. The inverter comprises a housing and a control board provided inside the housing. By integrating the park lock control unit, the differential lock control unit and the motor control unit into the control board and controlling them with a same microprocessor, the layout space and hardware cost of the entire vehicle are saved. By adding a control loop between the position feedback acquisition and the park lock control unit, the closed-loop control of the parking function is realized. By adding a control loop between the state feedback acquisition and the differential lock control unit, the closed-loop control of the differential lock function is realized. In this way, the technical effects of sharing hardware resources, improving stability, and reducing failure rate are achieved.

9 Claims, 2 Drawing Sheets

(51) Int. Cl.

| | |
|---|---|
| ***B60L 15/00*** | (2006.01) |
| ***B60L 15/20*** | (2006.01) |
| ***F16H 48/34*** | (2012.01) |
| ***F16H 63/48*** | (2006.01) |
| ***H02K 11/33*** | (2016.01) |

(52) U.S. Cl.

CPC ........... *F16H 48/34* (2013.01); *F16H 63/483* (2013.01); *B60K 2023/046* (2013.01); *H02K 2211/03* (2013.01)

(56) References Cited

U.S. PATENT DOCUMENTS

| | | | | |
|---|---|---|---|---|
| 2023/0042441 | A1* | 2/2023 | Fujita .................... | F16D 65/183 |
| 2023/0074092 | A1 | 3/2023 | Vasanadu et al. | |
| 2023/0104316 | A1 | 4/2023 | Hirota et al. | |

FOREIGN PATENT DOCUMENTS

| | | |
|---|---|---|
| JP | 2012-122592 | 6/2012 |
| JP | 2021136761 A | 9/2021 |

* cited by examiner

INVERTER

CROSS-REFERENCE TO RELATED APPLICATIONS

This application claims priority to China Application No. 202410937215.X filed on Jul. 12, 2024.

TECHNICAL FIELD

The present disclosure relates to the technical field of motor control, and in particular to an inverter.

BACKGROUND

New energies have advantages of being clean, low-carbon, safe and efficient, and thus the demand for electric vehicles is increasing. The inverter is the core component of the vehicle power system. With the continuous reduction of the internal space of the vehicle, the requirements for the integration of the inverter are getting higher.

In the prior art, for the realization of the parking function and differential lock function of the vehicle, the traditional approach is to equip the main drive system of the vehicle with an inverter, a park lock controller and a differential lock controller. This distributed design of controllers not only increases the layout space of the vehicle and has high costs, but also requires different manufacturers to supply the controllers, which results in difficulties in development. At the same time, the distributed controllers have a low safety level and a high risk of failure.

SUMMARY

In view of the above problems, the present disclosure is proposed to provide an inverter to achieve the technical effect of integrating the inverter, the park lock controller and the differential lock controller together and controlling them through the same microprocessor, sharing hardware resources, saving vehicle space, improving stability and reducing failure rate.

The present disclosure adopts the following technical solution.

An inverter, comprising: a housing and a control board provided inside the housing, wherein (a) the control board is provided thereon with a microprocessor, a park lock control unit and a differential lock control unit, and the park lock control unit and the differential lock control unit are electrically connected to the microprocessor respectively;

(b) the microprocessor is communicatively connected to an entire vehicle controller of a vehicle for receiving entire vehicle control instructions;

(c) the park lock control unit and the differential lock control unit use the same microprocessor for closed-loop control and are integrated into the control board, (d) the closed-loop control comprises a control loop between position feedback acquisition and the park lock control unit, and a control loop between state feedback acquisition and the differential lock control unit.

Optionally, the control board is further provided with a motor control unit electrically connected to the microprocessor;

the motor control unit, the park lock control unit, and the differential lock control unit are controlled by the same microprocessor and integrated into the control board.

Optionally, a parking mechanism of the vehicle comprises at least a parking actuator and a parking position sensor, and the park lock control unit comprises a parking driver;

(a) the parking driver is electrically connected to the microprocessor and is used to drive the parking actuator to achieve a parking-in or parking-out action.

Optionally, in the control loop between the position feedback acquisition and the park lock control unit, (a) when the parking actuator performs the parking-in or parking-out action, the microprocessor outputs a first SENT signal as a first instruction signal to control the parking actuator to acquire a parking position signal.

Optionally, the park lock control unit further comprises a position sampling circuit;

(a) the position sampling circuit is electrically connected to the microprocessor, and is used to receive the parking position signal sent by the parking position sensor, and send the parking position signal after sampled to the microprocessor.

Optionally, in the control loop between the position feedback acquisition and the park lock control unit, (a) when the parking actuator performs the parking-in or parking-out action, the microprocessor outputs a PWM signal as a first instruction signal to control the parking position sensor to acquire the parking position signal.

Optionally, the differential lock mechanism of the vehicle comprises at least a differential lock and an inductive sensor, and the differential lock control unit comprises a differential lock driver;

(a) the differential lock driver is electrically connected to the microprocessor, and is used to drive the differential lock to achieve a locking or unlocking action.

Optionally, in the control loop between the state feedback acquisition and the differential lock control unit, (a) when the differential lock performs a locking or unlocking action, the microprocessor outputs a second PWM signal as a second instruction signal to control the inductive sensor to acquire a differential lock state signal.

Optionally, the differential lock control unit further comprises a low side driver, (a) the low side driver is electrically connected to the microprocessor, and is used to receive the differential lock state signal sent by the inductive sensor, and send the differential lock state signal to the microprocessor.

Optionally, the motor control unit comprises a motor driver and an IGBT power unit, (a) the motor driver is electrically connected to the microprocessor, and the motor driver converts and outputs a current control signal through the IGBT power unit to adjust a speed and torque of a motor.

As can be seen from the above, the following beneficial effects can be achieved by at least one of the above technical solutions adopted in the present disclosure. An inverter is provided, which comprises a housing and a control board provided inside the housing; the control board is provided thereon with a microprocessor, a park lock control unit, a differential lock control unit and a motor control unit. The park lock control unit, the differential lock control unit and the motor control unit are electrically connected to the microprocessor respectively. By integrating the park lock control unit, the differential lock control unit, and the motor control unit together and controlling them with the same microprocessor, the space and hardware cost of the entire vehicle are saved. By adding a control loop between the position feedback acquisition and the park lock control unit, the closed-loop control of the parking function is realized.

By adding a control loop between the state feedback acquisition and the differential lock control unit, the closed-loop control of the differential lock function is realized. In this way, the technical effects of sharing hardware resources, improving stability, and reducing failure rate are achieved.

The above is only an overview of the technical solutions of the present disclosure. In order to better understand the technical means of the present disclosure so that it can be implemented according to the contents of the description, and in order to make the above and other objects, features and advantages of the present disclosure more obvious and easier to understand, the specific embodiments of the present disclosure are given below.

BRIEF DESCRIPTION OF DRAWINGS

By reading the detailed description of the preferred embodiments below, various other advantages and benefits will become clear to a person of ordinary skill in the art. The accompanying drawings are only used for the purpose of illustrating the preferred embodiments, and should not be considered as a limitation to the present disclosure. Moreover, throughout the drawings, the same reference numerals are used to denote the same components. In the drawings.

Figure 1:
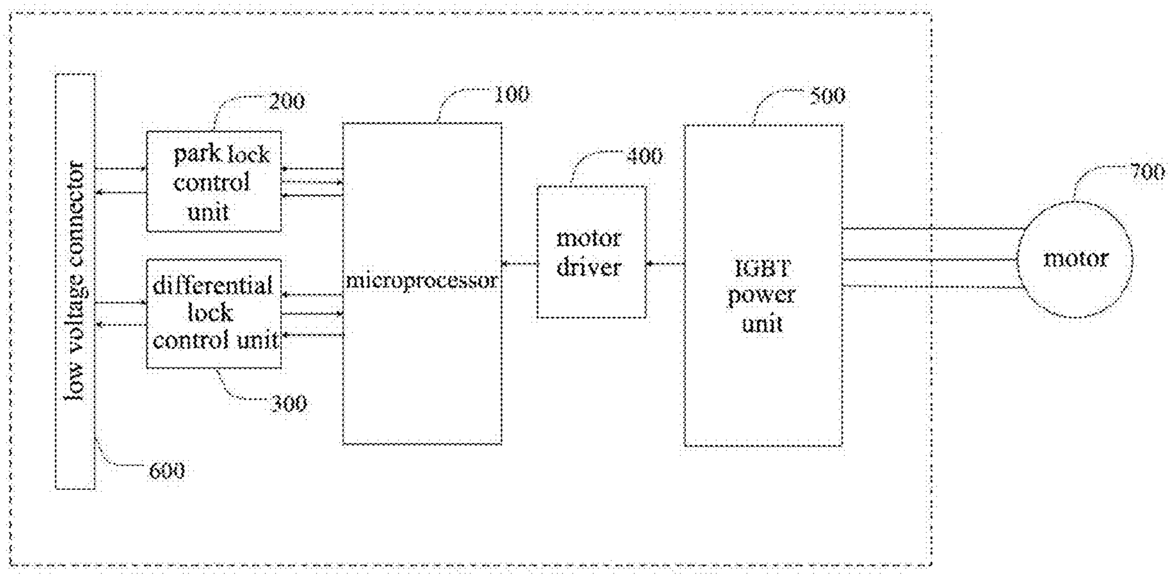
FIG. 1 is a schematic diagram of the integration of an inverter in an embodiment of the present disclosure.

In the drawings: 100, microprocessor; 200, park lock control unit; 300, differential lock control unit; 400, motor driver; 500, IGBT power unit; 600, low voltage connector; 700, motor; 800, parking mechanism; 900, differential lock mechanism; 210, parking driver; 220, position sampling circuit; 310, differential lock driver; 320, low side driver; 810, parking actuator; 820, parking position sensor; 910, differential lock; 920, inductive sensor.

DETAILED DESCRIPTION

Exemplary embodiments will be described in detail herein with reference to the accompanying drawings. Although exemplary embodiments of the present disclosure are shown in the drawings, it should be understood that the present disclosure can be implemented in various forms and should not be limited by the embodiments described herein. On the contrary, these embodiments are provided in order to understand the present disclosure more thoroughly and to convey the scope of the present disclosure to those skilled in the art completely.

The inventive concept of the present disclosure is to integrate the motor control, park lock control and differential lock control functions, so that the motor control unit, park lock control unit and differential lock control unit are controlled by the same microprocessor, and a feedback acquisition loop is added to realize the closed-loop control functions of the parking module and the differential lock module respectively. In this way, the sharing of hardware resources can be realized, the layout space of the entire vehicle can be saved, and the safety and stability of the inverter can be improved.

The technical solutions provided by the embodiments of the present disclosure will be described in detail below in conjunction with the accompanying drawings.

Figure 2:
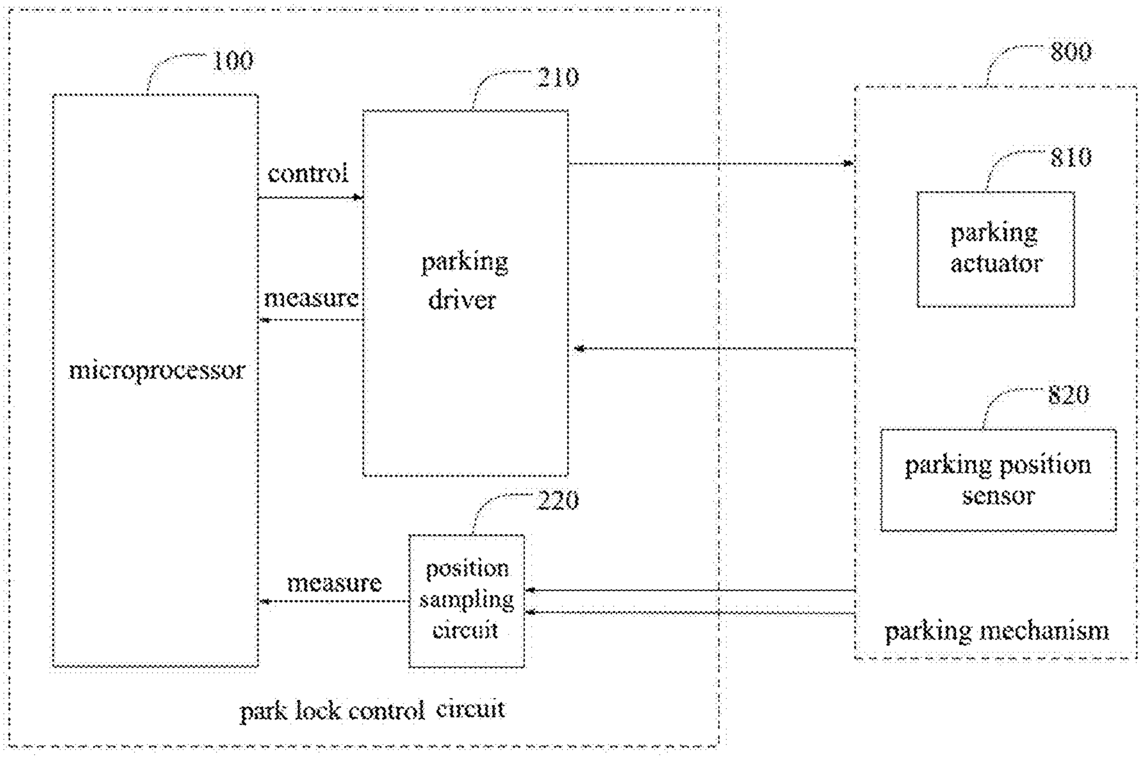
FIG. 2 is a schematic diagram of a park lock control unit in an embodiment of the present disclosure.
Figure 3:
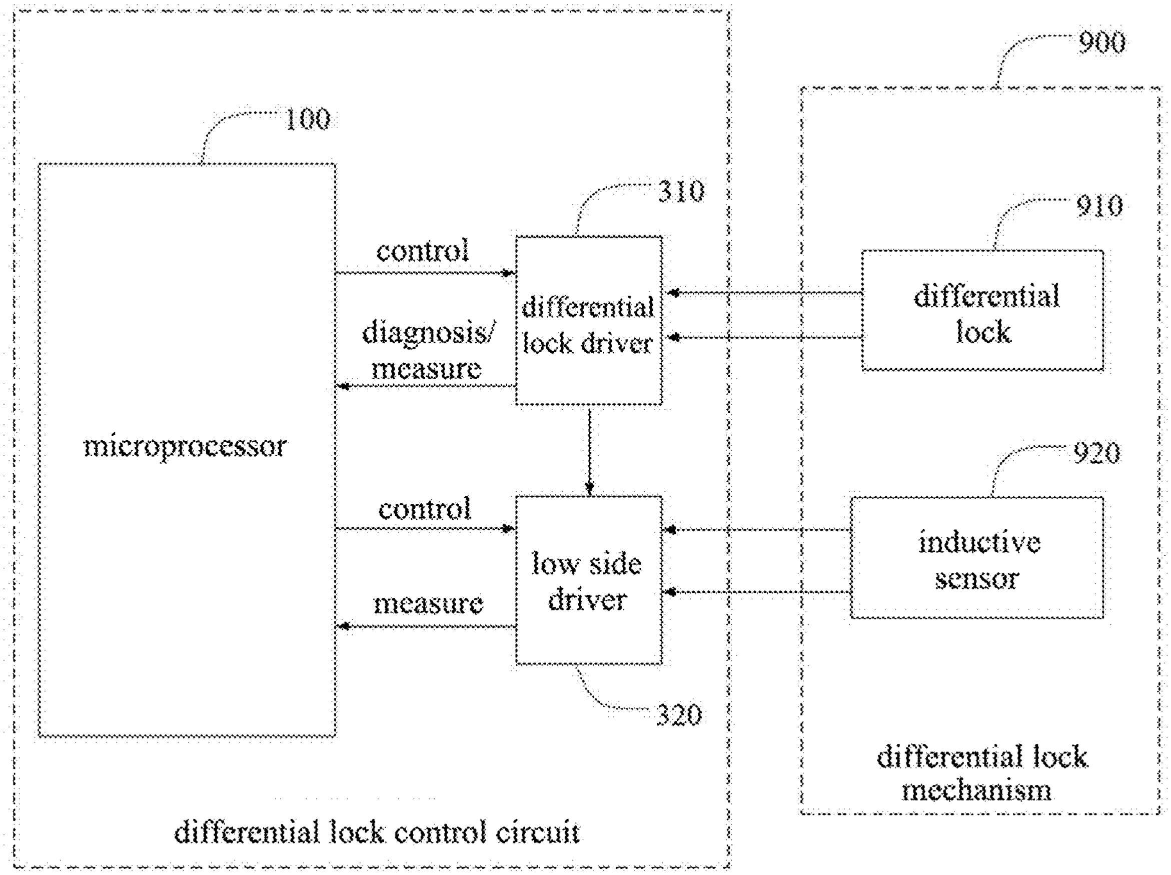
FIG. 3 is a schematic diagram of a differential lock control unit in an embodiment of the present disclosure.

FIG. 1 is a schematic diagram of the integration of an inverter in an embodiment of the present disclosure. Referring to FIG. 1, in the embodiment of the present disclosure, an inverter is proposed, which comprises a housing and a control board provided inside the housing. For simplicity, only circuit control units of the inverter are shown in FIGS. 1 to 3, and the mechanical structure related to the inverter is not shown. The relevant mechanical structure of the inverter is not limited in the present disclosure.

In the present embodiment, the control board is provided thereon with a microprocessor 100, a park lock control unit 200 and a differential lock control unit 300. The park lock control unit 200 and the differential lock control unit 300 are electrically connected to the microprocessor 100 respectively. The microprocessor 100 is communicatively connected to an entire vehicle controller of the vehicle, and is used to receive entire vehicle control instructions. The park lock control unit 200 and the differential lock control unit 300 use the same microprocessor 100 for closed-loop control and are integrated into the control board. The closed-loop control comprises a control loop between position feedback acquisition and the park lock control unit 200, and a control loop between state feedback acquisition and the differential lock control unit 300.

Specifically, the control board is a PCBA circuit board. The park lock control unit 200 and the differential lock control unit 300 are integrated on the same PCBA circuit board, and connected to the parking mechanism or the differential lock mechanism through a low-voltage connector 600 and a wiring harness, so that the signal can be processed by the microprocessor 100. The microprocessor 100 can communicate with the entire vehicle controller. The entire vehicle controller is the central control unit and the core of the entire vehicle control system. It can be understood that the microprocessor 100 and the entire vehicle controller can be connected through a corresponding communication unit, and the microprocessor 100 can receive the entire vehicle control instructions sent by the entire vehicle controller. The entire vehicle control instructions include but are not limited to motor acceleration and deceleration instructions, braking instructions, parking-instructions, differential lock instructions, etc. For example, the microprocessor 100 can send control instructions for parking-in/out actions to the parking actuator 810, and send control instructions for unlocking/locking actions to the differential lock, etc., to realize the parking function and differential lock function of the vehicle.

It is worth noting that the improvement of the technical solution of the present disclosure lies in the related design of the park lock control unit 200 and the differential lock control unit 300. Of course, the inverter may also comprise components such as a communication unit, a DC link capacitor, a current sensor, a connector, a choke assembly, a cooling assembly, and a wiring harness. The models, installation positions, and connection methods of various components and electronic components in the inverter can be adjusted and set by technicians in the field, and are not limited here.

Thus, by adopting the inverter as described above, and providing the microprocessor, the park lock control unit and the differential lock control unit that are electrically connected to the microprocessor on the control board inside the housing of the inverter, the integration and reliability of the inverter can be further improved. The microprocessor can communicate with the entire vehicle controller of the vehicle and receive the entire vehicle control instructions, and the park lock control unit and the differential lock control unit use the same microprocessor for closed-loop control and are integrated into the control board, so the number of microprocessors can be reduced, and hardware resources can be saved. Moreover, by providing the control loop between the position feedback acquisition and the park lock control unit, and providing the control loop between the state feedback acquisition and the differential lock control unit, the closed-loop control of the park lock control unit and the differential lock control unit can be realized according to the position feedback or state feedback.

Unlike the traditional solution that requires the main drive system of the vehicle to have three controllers, namely, the inverter, the park lock controller and the differential lock controller, the inverter in the embodiment of the present disclosure solves the problems of increased vehicle layout space and high cost caused by the distributed design, realizes the sharing of hardware resources, and achieves the technical effect of improving system stability and reducing control failure rate.

In some embodiments, further referring to FIG. 1, the control board is further provided with a motor control unit electrically connected to the microprocessor 100; and the motor control unit, the park lock control unit 200, and the differential lock control unit 300 are controlled by the same microprocessor 100 and integrated into the control board.

For example, the microprocessor 100 receives a motor control instruction for controlling the motor 700 from the entire vehicle controller, and the electric energy in the battery pack is converted into the electric energy needed by the motor 700 after being inverted and modulated by the power unit (such as an IGBT (insulated gate bipolar transistor)), and the microprocessor 100 outputs a current control signal, thereby controlling the speed and torque of the motor 700 to meet the driving requirements of the vehicle.

In some preferred embodiments, the microprocessor 100 can be a single-chip microcomputer with a high functional safety level, such as the TC377 chip, so as to meet the requirements of the functional safety ASILD (automotive safety integrity level). Of course, the model, connection relationship, installation position, etc. of the microprocessor 100 are not limited in the present disclosure. Technicians in this field can refer to relevant chip manuals to select and connect the electronic components in each functional circuit of the inverter by themselves, which will not be repeated here.

FIG. 2 is a schematic diagram of a park lock control unit in an embodiment of the present disclosure. The left dashed box in FIG. 2 is a block diagram of the park lock control circuit, and the right dashed box in FIG. 2 is a block diagram of the parking mechanism. As shown in FIGS. 1 and 2, in some preferred embodiments, the parking mechanism 800 of the vehicle comprises at least a parking actuator 810 and a parking position sensor 820. The park lock control unit 200 comprises a parking driver 210. The parking driver 210 is electrically connected to the microprocessor 100, and is used to drive the parking actuator 810 to realize the parking-in or parking-out action, thereby realizing the parking function of the vehicle.

Of course, the parking mechanism 800 also comprises mechanical structures such as a parking motor, a parking gear, a pawl, a position-limiting plate, and a cam disc, which can be set by technicians in this field, and are not limited here.

In some embodiments, the park lock control unit 200 receives a park lock control instruction sent by the microprocessor 100, and controls the parking mechanism 800 of the vehicle to perform the parking-in or parking-out action. For example, the microprocessor 100 can output an instruction signal for realizing the forward or backward rotation of the parking motor. The parking actuator 810 rotates forward and drives the position-limiting plate to rotate through a guide shaft, the position-limiting plate rotates to press the spring and drives the cam disc to rotate. At this point, the cam disc rotates to press the pawl, so that the pawl is engaged with the gear to realize the parking-in action. Furthermore, for example, the parking actuator 810 rotates backward and drives the position-limiting plate to return. At this point, the cam disc returns to its original position under the drive of the position-limiting plate, and the pawl is disengaged under the thrust of the torsion spring and the rotation of the gear to realize the parking-out action.

In some preferred embodiments, referring to FIG. 2, in the control loop between the position feedback acquisition and the park lock control unit 200, when the parking actuator 810 performs the parking-in or parking-out action, the microprocessor 100 outputs a first SENT signal as the first instruction signal to control the parking actuator 810 to acquire the parking position signal. The SENT signal is a single edge nibble transmission protocol, and the first instruction signal is a control instruction signal for acquiring the parking position. Of course, there may be other signal transmission modes between the microprocessor 100 and the parking actuator 810, which are not limited here.

In other words, the parking actuator 810 in this embodiment has a parking position feedback function, and can acquire the parking position and obtain a parking position signal under the control of the microprocessor 100 to detect whether the parking position is in place. For example, the parking actuator 810 is equipped with a sensor. When it is detected that the parking is not in place, a non-in-place signal is fed back to the microprocessor 100 and the parking action is continued; when it is detected that the parking is in place, an in-place signal is fed back to the microprocessor 100 and the parking is completed, thereby realizing the closed-loop control of the parking function.

In some preferred embodiments, further referring to FIG. 2, the park lock control unit 200 further comprises a position sampling circuit 220. The position sampling circuit 220 is electrically connected to the microprocessor 100 and the parking position sensor 820 respectively, and is used to receive the parking position signal sent by the parking position sensor 820, and send the parking position signal after sampled to the microprocessor 100. Of course, the model of the parking position sensor 820 is not limited in this embodiment.

For example, in the control loop between the position feedback acquisition and the park lock control unit 200, when the parking actuator 810 performs the parking-in or parking-out action, the microprocessor 100 outputs a PWM (Pulse Width Modulation) signal as the first instruction signal to control the parking position sensor 820 to acquire the parking position signal. The first instruction signal is the control instruction signal for acquiring the parking position. Of course, there may be other signal transmission modes between the microprocessor 100 and the parking position sensor 820, which are not limited here.

The parking position sensor 820 in this embodiment has a parking position feedback function, which can also acquire the parking position signal under the control of the microprocessor 100 to detect whether the parking position is in place and realize the closed-loop control of the parking function. That is to say, the position feedback functions of the parking actuator 810 and the parking position sensor 820 are redundant with each other. When the position feedback function of either of them fails, the other can still play the role of detecting the parking position, thereby reducing the failure rate and meeting the functional safety requirements of the vehicle.

FIG. 3 is a schematic diagram of a differential lock control unit in an embodiment of the present disclosure. The left dashed box in FIG. 3 is a block diagram of the differential lock control circuit, and the right dashed box in FIG. 3 is a block diagram of the differential lock mechanism. Referring to FIG. 3, in some preferred embodiments, the differential lock mechanism 900 of the vehicle comprises at least a differential lock 910 and an inductive sensor 920. The differential lock control unit 300 comprises a differential lock driver 310. The differential lock driver 310 is electrically connected to the microprocessor 100, and is used to drive the differential lock 910 to achieve locking or unlocking action, thereby realizing the differential lock function of the vehicle. Of course, other mechanical structures in the differential lock mechanism 900 are not limited in this embodiment, and can be set by technicians in the field.

In some embodiments, the differential lock control unit 300 receives the differential lock control instruction sent by the microprocessor 100, and controls the differential lock mechanism 900 of the vehicle to perform a locking or unlocking action. For example, in the control loop between the state feedback acquisition and the differential lock control unit 300, when the differential lock 910 performs a locking or unlocking action, the microprocessor 100 outputs a second PWM signal as the second instruction signal to control the inductive sensor 920 to acquire the differential lock state signal. The second instruction signal is the control instruction signal for acquiring the differential lock state. Of course, there may be other signal transmission modes between the microprocessor 100 and the inductive sensor 920, which are not limited here. The inductive sensor 920 is preferably an electric inductive sensor to improve the stability of the inverter.

That is to say, the inductive sensor 920 in this embodiment has a differential lock state feedback function, and can detect the differential lock state and obtain a differential lock state signal under the control of the microprocessor 100 to detect whether the execution of the differential lock 910 has completed. For example, when the differential lock 910 is detected to be faulty or execution failure, an abnormal state signal is fed back to the microprocessor 100 and an alarm is provided to continue to execute the unlocking/locking action. When the differential lock 910 is detected to be working normally or executing successfully, a normal state signal is fed back to the microprocessor 100 and the execution action is completed. In this way, the closed-loop control of the differential lock function is realized, which can not only achieve the effect of low power consumption, but also can perform differential lock state diagnosis in real time to reduce the fault of the controller and improve the safety and stability of the inverter.

In some embodiments, further referring to FIG. 3, the differential lock control unit 300 further comprises a low side driver 320. The low side driver 320 is electrically connected to the microprocessor 100, and is used to receive a differential lock state signal sent by the inductive sensor 920 and send the differential lock state signal to the microprocessor 100, thereby enabling the switch control of the inductive sensor 920 to detect the real-time state of the differential lock 910.

In some embodiments, referring to FIG. 1, the motor control unit comprises a motor driver 400 and an IGBT power unit 500, and the power drive system of the vehicle comprises at least a motor 700. The motor driver 400 is electrically connected to the microprocessor 100. The motor control unit can receive the motor control instruction sent by the microprocessor 100, so that the motor driver 400 converts and outputs the current control signal through the IGBT power unit 500 to adjust the speed and torque of the motor 700, thereby realizing the motor control function of the vehicle. Of course, the relevant designs of the motor driver 400 and the IGBT power unit 500 are not the improvement points of the present disclosure. Other structures of the power drive system are not limited in the embodiments of the present disclosure, and can be set by technicians in the field.

In sum, the technical solutions of the present disclosure at least achieve the following technical effects. An inverter is provided, which comprises a housing and a control board provided inside the housing; the control board is provided thereon with a microprocessor, a park lock control unit, a differential lock control unit and a motor control unit. The park lock control unit, the differential lock control unit and the motor control unit are electrically connected to the microprocessor respectively. By integrating the park lock control unit, the differential lock control unit, and the motor control unit together and controlling them with the same microprocessor, the space and hardware cost of the entire vehicle are saved. By adding a control loop between the position feedback acquisition and the park lock control unit, the closed-loop control of the parking function is realized. By adding a control loop between the state feedback acquisition and the differential lock control unit, the closed-loop control of the differential lock function is realized. In this way, the technical effects of sharing hardware resources, improving stability, and reducing failure rate are achieved.

It should be noted that:

Many details are discussed in the specification provided herein. However, it should be understood that the embodiments of the disclosure can be implemented without these specific details. In some examples, the well-known methods, structures and technologies are not shown in detail so as to avoid an unclear understanding of the description.

It should be noted that the above-described embodiments are intended to illustrate but not to limit the disclosure, and alternative embodiments can be devised by the person skilled in the art without departing from the scope of claims as appended. The wording "comprise" or "include" does not exclude the presence of elements or steps not listed in a claim. The wording "a" or "an" in front of an element does not exclude the presence of a plurality of such elements. The disclosure may be realized by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as a name.

What is claimed is:

1. An inverter, comprising: a housing and a control board provided inside the housing, wherein the control board is provided thereon with a microprocessor, a park lock control unit and a differential lock control unit, and the park lock control unit and the differential lock control unit are electrically connected to the microprocessor respectively;

the microprocessor is communicatively connected to an entire vehicle controller of a vehicle for receiving entire vehicle control instructions;

the park lock control unit and the differential lock control unit use the same microprocessor for closed-loop control and are integrated into the control board, the closed-loop control comprises a control loop between position feedback acquisition and the park lock control unit, and a control loop between state feedback acquisition and the differential lock control unit, a parking mechanism of the vehicle comprises at least a parking actuator and a parking position sensor, and the park lock control unit comprises a parking driver;

the parking driver is electrically connected to the microprocessor and is used to drive the parking actuator to achieve a parking-in or parking-out action, wherein in the control loop between the position feedback acquisition and the park lock control unit, when the parking actuator performs the parking-in or parking-out action, the microprocessor outputs a first SENT signal as a first instruction signal to control the parking actuator to acquire a parking position signal.

2. The inverter according to claim 1, wherein the control board is further provided with a motor control unit electrically connected to the microprocessor;

the motor control unit, the park lock control unit, and the differential lock control unit are controlled by the same microprocessor and integrated into the control board.

3. The inverter according to claim 1, wherein the park lock control unit further comprises a position sampling circuit;

the position sampling circuit is electrically connected to the microprocessor, and is used to receive the parking position signal sent by the parking position sensor, and send the parking position signal after sampled to the microprocessor.

4. The inverter according to claim 3, wherein in the control loop between the position feedback acquisition and the park lock control unit, when the parking actuator performs the parking-in or parking-out action, the microprocessor outputs a PWM signal as a first instruction signal to control the parking position sensor to acquire the parking position signal.

5. The inverter according to claim 1, wherein the differential lock mechanism of the vehicle comprises at least a differential lock and an inductive sensor, and the differential lock control unit comprises a differential lock driver;

the differential lock driver is electrically connected to the microprocessor, and is used to drive the differential lock to achieve a locking or unlocking action.

6. The inverter according to claim 5, wherein in the control loop between the state feedback acquisition and the differential lock control unit, when the differential lock performs a locking or unlocking action, the microprocessor outputs a second PWM signal as a second instruction signal to control the inductive sensor to acquire a differential lock state signal.

7. The inverter according to claim 6, wherein the differential lock control unit further comprises a low side driver, the low side driver is electrically connected to the microprocessor, and is used to receive the differential lock state signal sent by the inductive sensor, and send the differential lock state signal to the microprocessor.

8. The inverter according to claim 2, wherein the motor control unit comprises a motor driver and an IGBT power unit, the motor driver is electrically connected to the microprocessor, and the motor driver converts and outputs a current control signal through the IGBT power unit to adjust a speed and torque of a motor.

9. The inverter according to claim 1, wherein the park lock control unit further comprises a position sampling circuit;

the position sampling circuit is electrically connected to the microprocessor, and is used to receive the parking position signal sent by the parking position sensor, and send the parking position signal after sampled to the microprocessor.

* * * * *